United States Patent [19]

Urabe et al.

[11] Patent Number: 4,734,763
[45] Date of Patent: Mar. 29, 1988

[54] APPARATUS FOR GENERATING POSITIVE OR NEGATIVE IMAGE OUTPUT SIGNALS FROM EITHER POSITIVE OR NEGATIVE ORIGINALS

[75] Inventors: Hitoshi Urabe; Takao Shigaki; Osamu Shimazaki, all of Kanagawa, Japan

[73] Assignee: Fuji Photo Film Co., Ltd., Kanagawa, Japan

[21] Appl. No.: 892,454

[22] Filed: Aug. 4, 1986

Related U.S. Application Data

[63] Continuation of Ser. No. 627,701, Jul. 3, 1984, abandoned.

[30] Foreign Application Priority Data

Jul. 4, 1983 [JP] Japan .................. 58-121325
Mar. 12, 1984 [JP] Japan .................. 59-46897

[51] Int. Cl.$^4$ .................. G03F 3/08; H04N 1/46
[52] U.S. Cl. .................. 358/80; 358/75
[58] Field of Search .................. 358/75, 76, 78, 80

[56] References Cited

U.S. PATENT DOCUMENTS

| | | | |
|---|---|---|---|
| 4,075,662 | 2/1978 | Gall .................. | 358/80 |
| 4,410,909 | 10/1983 | Ueda et al. .................. | 358/75 |
| 4,467,364 | 8/1984 | Konagaya .................. | 358/80 |
| 4,472,736 | 9/1984 | Ushio et al. .................. | 358/80 |
| 4,561,016 | 12/1985 | Jung et al. .................. | 358/80 |
| 4,591,904 | 5/1986 | Urabe et al. .................. | 358/75 |
| 4,626,903 | 12/1986 | Giesche et al. .................. | 358/80 |

OTHER PUBLICATIONS

James, *The Theory of the Photographic Process*, MacMillan, 1977, pp. 519-529, 571-575.

*Primary Examiner*—James J. Groody
*Assistant Examiner*—Randall S. Svihla
*Attorney, Agent, or Firm*—Sughrue, Mion, Zinn, Macpeak, and Seas

[57] ABSTRACT

An image processing apparatus comprises positive and negative original input signal processing sections respectively converting positive and negative signals obtained by photoelectric scanning of positive and negative originals into positive density signals, and a color processing section for color-processing the positive density signals. The circuits used in the positive original input signal processing section are preferably all included as well in the negative original input signal processing section, so that common circuits may be employed for the two processing sections. This is similarly the case with the positive and negative image output sections. The apparatus also has a positive image output section for converting the output signal of the color processing section into a light amount control signal for a light source for reproducing a positive image, and a negative image output section for converting the output signal of the color processing section into a negative density signal and then into a light amount control signal for forming an intermediate negative so that a desired density is obtained on an ultimate printing photosensitive material when the intermediate negative is printed thereon. During processing in the negative original input signal processing section, a negative original density signal is converted into a density signal representing a corresponding positive image such that the weight ratio of the Y, M and C color signals is always 1:1:1 for a gray original.

4 Claims, 11 Drawing Figures

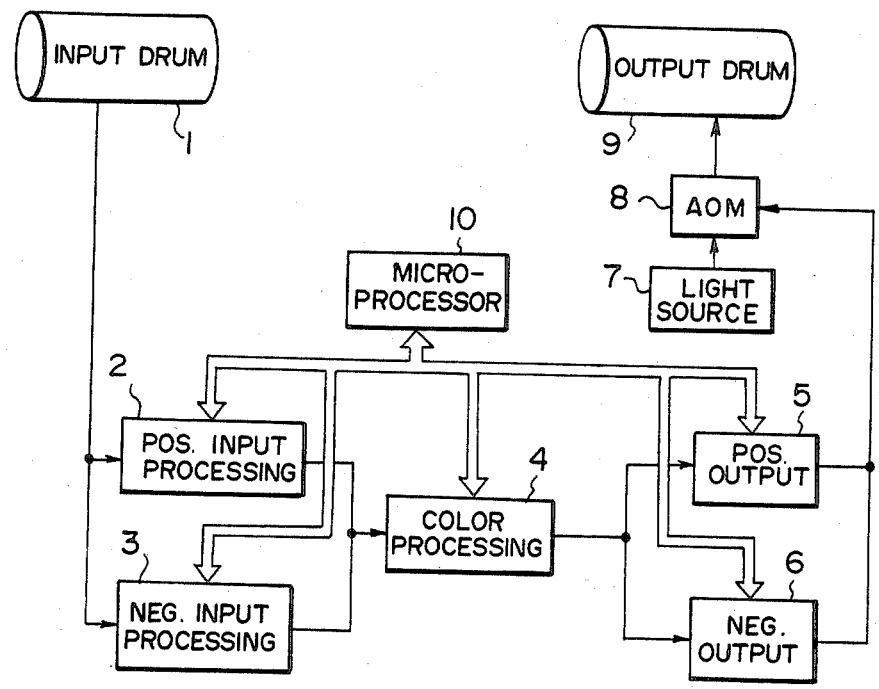
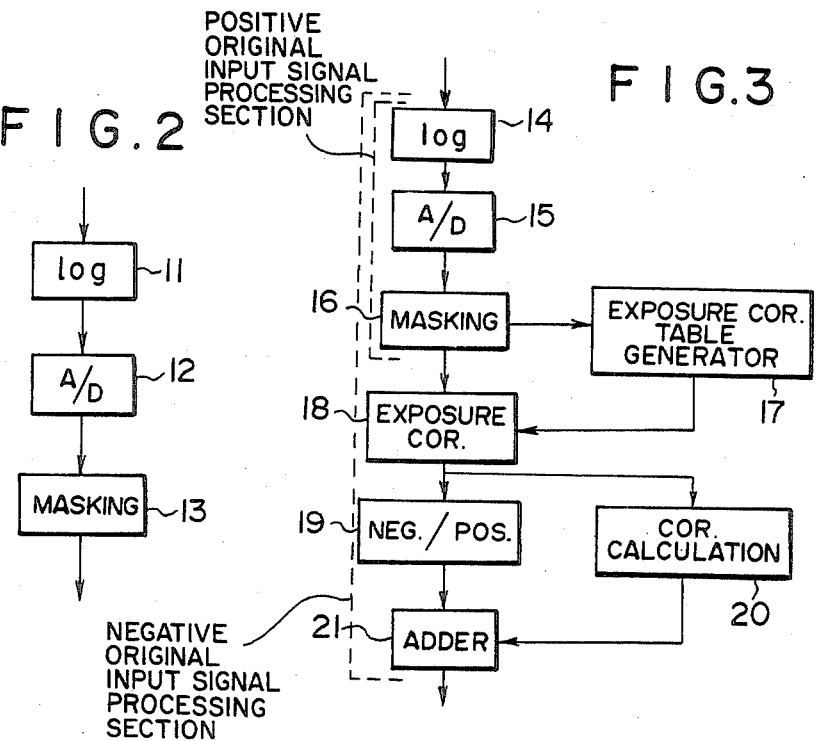

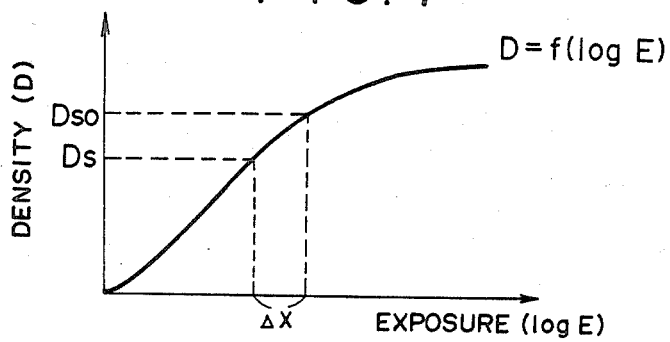
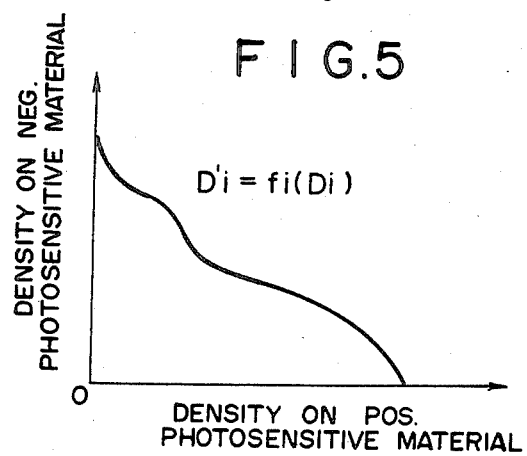
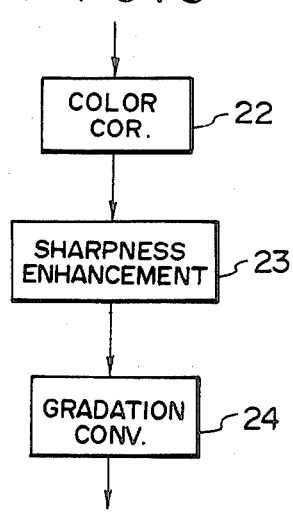
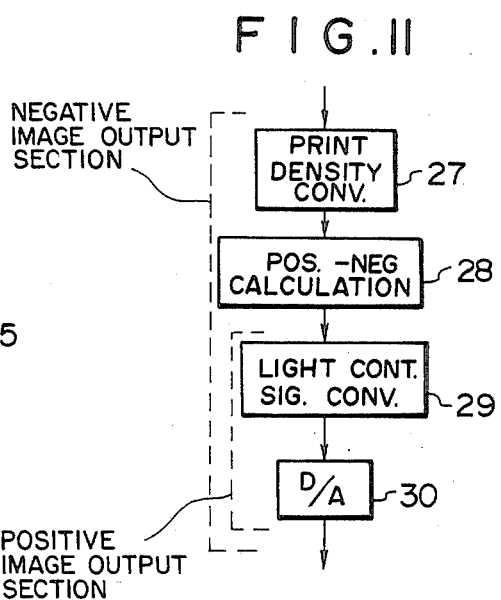
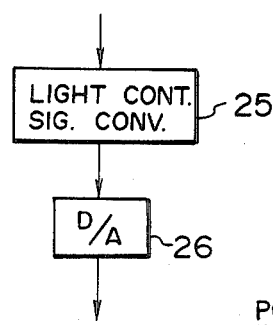

APPARATUS FOR GENERATING POSITIVE OR NEGATIVE IMAGE OUTPUT SIGNALS FROM EITHER POSITIVE OR NEGATIVE ORIGINALS

This is a continuation of application Ser. No. 627,701 filed 7/3/84, now abandoned.

BACKGROUND OF THE INVENTION

1. Field of the Invention

This invention relates to an image processing apparatus for converting an image signal detected by photoelectrically scanning an image original into a density signal, conducting a color processing of the density signal, and then generating a control signal for controlling a light source used for forming a reproduced image.

2. Description of the Prior Art

There have heretofore been known image reproducing apparatuses wherein a density signal obtained by photoelectrically scanning a color image original is subjected to a color processing such as color correction, sharpness enhancement, or gradation conversion, and the light amount emitted by a reproduction light source is controlled on the basis of the color-processed density signal, thereby reproducing an image of a desired quality. In general, in the conventional image reproducing apparatuses, a positive reproduced image is obtained from a positive color original. Recently, however, a need has been felt to obtain an intermediate negative from a positive color original, a positive image from a negative original, or an intermediate negative from a negative original.

However, various problems arise when the signal processing system for obtaining a positive image from a positive original in the conventional image reproducing apparatuses is directly used for forming an intermediate negative from a positive original, a positive image from a negative original, or an intermediate negative from a negative original. For example, in the case where an intermediate negative is formed from a positive original or a negative original and an operator controls various parameters in the color processing step in the same manner as when a positive image is formed from a positive original, the intermediate negative formed thereby is such that, when the intermediate negative is ultimately used for printing on a printing photosensitive material, an image of a desired density cannot be obtained due to a difference in spectral sensitivity between the photosensitive material for the intermediate negative and the ultimate printing photosensitive material, or the like. Therefore, when an image is formed on the photosensitive material for the intermediate negative, the operator must take into consideration the spectral absorbances of the dyes of the photosensitive material for the intermediate negative, the spectral sensitivity of the ultimate printing photosensitive material, the spectral intensity of the light source of the printer, and the like. Thus the burden to the operator increases, and he will be unable to carry out the operation without a certain degree of skill. Further, when the original is a negative and a density signal of the negative image is sent to the color processing section, it is not always possible for the operator to accurately control the parameters no matter how skillful he may be.

SUMMARY OF THE INVENTION

The primary object of the present invention is to provide an image processing apparatus which can carry out color processings not only when a positive image is formed from a positive original but also when an intermediate negative is formed from a positive original, a positive image from a negative original, and an intermediate negative from a negative original.

Another object of the present invention is to provide an image processing apparatus wherein operations required to be conducted by an operator at a color processing section for obtaining an intermediate negative from a positive original, a positive image from a negative original, and an intermediate negative from a negative original are almost the same as the operations for obtaining a positive image from a positive original.

The specific object of the present invention is to provide an image processing apparatus which minimizes the size of an image reproducing system.

A further object of the present invention is to provide an image input processing apparatus which makes it possible to conduct color processings by the same color processing circuit in both cases where the original is positive and where the original is negative.

A still further object of the present invention is to provide an image output processing apparatus which eliminates the necessity of conducting a density conversion processing for forming a density representing an intermediate negative image in a color processing section even when a negative image is output.

The image processing apparatus adapted to negatives and positives in accordance with the present invention comprises a positive original input signal processing section for receiving an image signal of a positive original and generating therefrom a density signal representing a positive image, and a negative original input signal processing section for receiving an image signal of a negative original and generating therefrom a density signal representing a positive image. The apparatus is also provided with a color processing section for conducting various color processings of the density signals sent from the positive original input signal processing section and the negative original input signal processing section, and generating color-processed density signals as output signals. The apparatus also has a positive image output section for receiving the density signal sent from the color processing section and generating therefrom a light amount control signal for forming a density representing a positive image on an output photosensitive material, and a negative image output section for receiving the density signal sent from the color processing section and generating therefrom a light amount control signal for forming a density representing a negative image on an output photosensitive material.

In the color processing section, when a density representing a positive image is formed on an output photosensitive material, a color processing is conducted so as to form the density representing the positive image. When a density representing a negative image is formed on the output photosensitive material, a color processing is carried out so that a desired density is obtained on an ultimate printing photosensitive material.

In the negative image output section, the color-processed density signal sent from the color processing section, i.e. the density signal for forming a desired density on the ultimate printing photosensitive material, is converted into a density signal for forming a density representing an intermediate negative image for use in printing the desired density on the ultimate printing photosensitive material. Then, the density signal for forming a density representing an intermediate negative image is further converted into a light amount control signal.

As the output photosensitive material for forming a density representing a positive image, color paper, a duplicate film, a reversal film, a G (large-size) printing film, or the like is used. As the ultimate printing photosensitive material, a G printing film, color paper, or the like is generally used.

As the output photosensitive material for forming a density representing a negative image, a negative film, the aforesaid output photosensitive material for forming a density representing a positive image, or the like is used.

In order to conduct a color processing accurately and simply, it is sometimes necessary that the weight ratio among the signals of the three primary colors, i.e. yellow (Y), magenta (M) and cyan (C), be always adjusted to 1:1:1 before the color processing is conducted in the color processing section. Therefore, in the negative original input signal processing section and the positive original input signal processing section, image signals should preferably be converted into density signals representing a positive image so that the weight ratio among the Y, M and C three primary color signals is always 1:1:1.

In the apparatus of the present invention, it is possible to conduct color processings not only when a positive image is formed from a positive original but also when an intermediate negative is formed from a positive original, a positive image from a negative original, and an intermediate negative from a negative original. Further, the operations required to be conducted by an operator at the color processing section for obtaining an intermediate negative from a positive original, a positive image from a negative original, and an intermediate negative from a negative original are almost the same as the operations for obtaining a positive image from a positive original. Accordingly, the apparatus of the present invention is very easy to operate and minimizes the size of an image reproducing system.

Also, since the density signals supplied to the color processing section always represent a positive image regardless of the type of the original (i.e. positive or negative), it is easy for the operator to control parameters at the color processing section.

Further, in the negative image output section, the color-processed density signal sent from the color processing section for forming a desired density on the ultimate printing photosensitive material is converted into a density signal for forming a density representing an intermediate negative image for use in printing the desired density on the ultimate printing photosensitive material. Therefore, in the color processing section, it is not necessary to carry out the density conversion processing, and it is sufficient to conduct the color processing by considering only the density which should be realized on the ultimate printing photosensitive material. Accordingly, the operations of parameters for conducting the color processing, which the operator must carry out, become simple, and no particular skill is required by the operator.

BRIEF DESCRIPTION OF THE DRAWINGS

FIG. 1 is a block diagram showing an image reproducing system in which an embodiment of the image processing apparatus in accordance with the present invention is employed, FIG. 2 is a block diagram showing the internal configuration of the positive original input signal processing section of the apparatus of FIG. 1, FIG. 3 is a block diagram showing the internal configuration of the negative original input signal processing section of the apparatus of FIG. 1, FIGS. 4 and 5 are explanatory graphs showing the conversion processing conducted by the negative original input signal processing section having the internal configuration as shown in FIG. 3, FIG. 6 is a block diagram showing the internal configuration of the color processing section of the apparatus of FIG. 1, FIG. 10 is a block diagram showing the internal configuration of the positive image output section of the apparatus of FIG. 1, and FIG. 11 is a block diagram showing the internal configuration of the negative image output section of the apparatus of FIG. 1.

DESCRIPTION OF THE PREFERRED EMBODIMENTS

Figure 7:
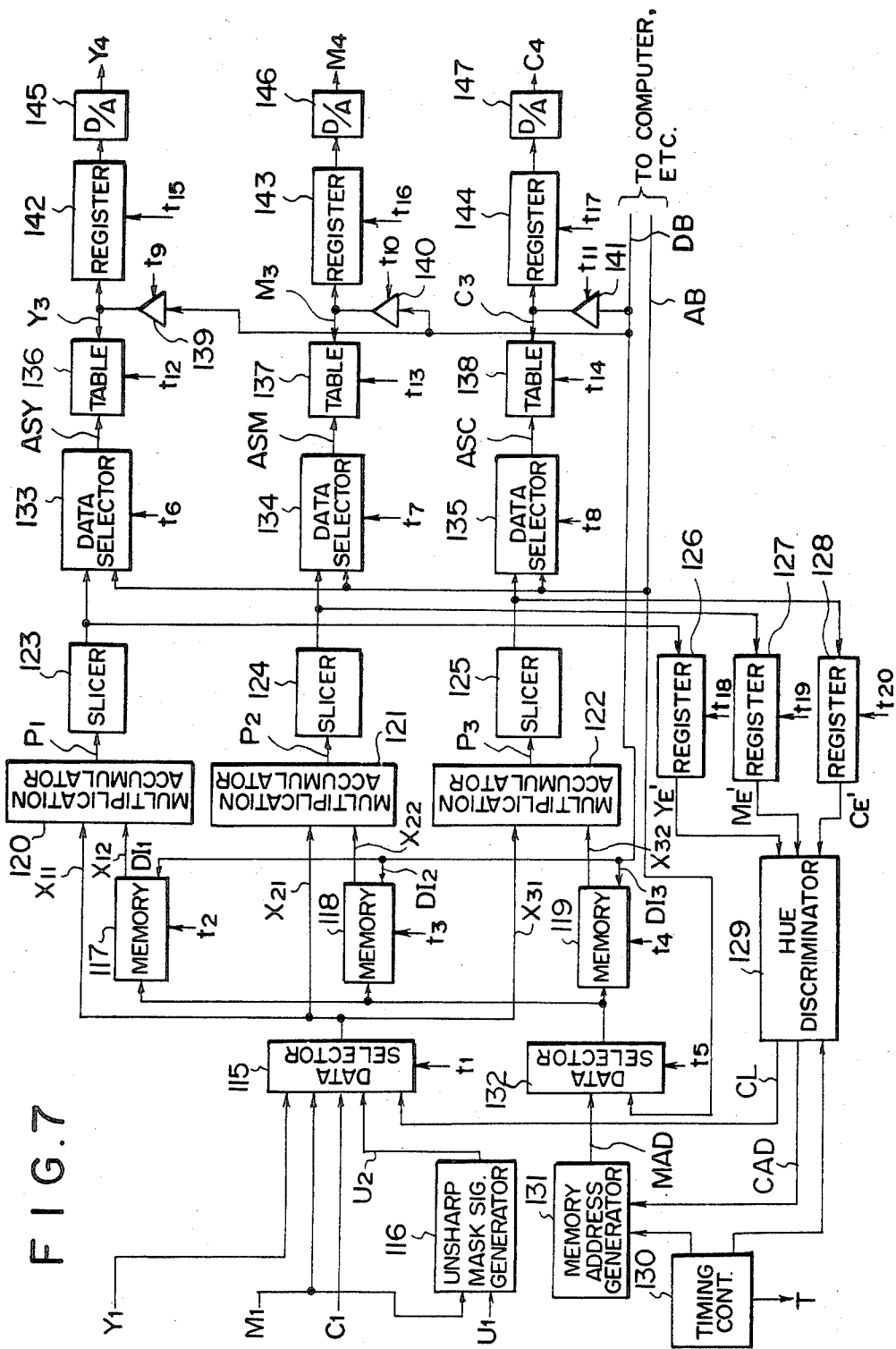
FIG. 7 is a block diagram showing an embodiment of the circuit configuration of the color processing section having the internal configuration as shown in FIG. 6.

The present invention will hereinbelow be described in further detail with reference to the accompanying drawings.

Overall Configuration of Embodiment

FIG. 1 is a block diagram showing an image reproducing system in which an embodiment of the image processing apparatus in accordance with the present invention is employed. The image reproducing system comprises an input drum 1 on which an image original is loaded and photoelectrically scanned and which outputs an image signal obtained thereby, a positive original input signal processing section 2 and a negative original input signal processing section 3 for converting the image signal into a positive density signal and sending out the positive density signal. The system is also provided with a color processing section 4 for conducting a color processing, such as color correction, of the positive density signal and sending out the color-processed positive density signal, a positive image output section 5 and a negative image output section 6 for converting the color-processed positive density signal sent from the color processing section 4 into a light amount control signal for obtaining a reproduced image and sending out the light amount control signal. The system is further provided with a light source 7 and an acousto-optic modulator (AOM) 8 for converting the light amount control signals sent from the positive image output section 5 and the negative image output section 6 into light amounts, and an output drum 9 on which a photosensitive material for forming a reproduced image is loaded. This embodiment is also provided with a microprocessor 10, so that coefficients used for calculation and table data used for conversion in the positive original input signal processing section 2, the negative original input signal processing section 3, the color processing section 4, the positive image output section 5, and the negative image output section 6 can be input from the outside by operating the microprocessor 10. Further, coefficients and data handled in the color processing section 4 can be manually changed by an operator. An image signal obtained by photoelectrically scanning a positive original is input to the positive original input signal processing section 2, and an image signal obtained by photoelectrically scanning a negative original is input to the negative original input signal processing section 3. When a positive image is formed on the output photosensitive material, the output signal of the color processing section 4 is input to the positive image output section 5. When a negative image is formed on the output photosensitive material, the output signal of the color processing section 4 is input to the negative image output section 6. Since this embodiment is constructed as described above, it is possible to conduct color processings of the density signals by use of the same color processing section 4 for all combinations of the positive and negative originals with the positive and negative reproduced images. The processing sections 2, 3 and 4 and the output sections 5 and 6 shown in FIG. 1 are provided with independent equivalent processing means for each of the Y, M and C three primary color signals. Therefore, the processing sections 2 and 3 and the output sections 5 and 6 shown in FIG. 1 will hereinbelow be described only for one of the Y, M and C three primary color signals, whereas the color processing section 4 will be described for all of the three primary color signals.

Configuration of Positive Original Input Signal Processing Section

As shown in FIG. 2, the positive original input signal processing section 2 comprises a logarithmic conversion circuit 11, an A/D converter 12, and a masking processing means 13. The logarithmic conversion circuit 11 receives the image signal obtained by photoelectric scanning of a positive original and converts the image signal into a density signal representing a positive image. The A/D converter 12 receives the density signal representing a positive image sent from the logarithmic conversion circuit 11 and converts the density signal into a digital density signal representing a positive image. The masking processing means 13 converts the density signal sent from the A/D converter 12, i.e. the integral density signal, into an analytical density signal, thereby removing the effect of color impurity of the dyes in the positive original, and sends the digital density signal representing a positive image, which is free from color impurity, to the color processing section 4.

Configuration of Negative Original Input Signal Processing Section

As shown in FIG. 3, the negative original input signal processing section 3 comprises a logarithmic conversion circuit 14, an A/D converter 15, a masking processing means 16, an exposure correction table generating means 17, an exposure correction means 18, a negative-to-positive conversion means 19, a correction value calculating means 20, and an adder 21. The logarithmic conversion circuit 14 receives the image signal obtained by photoelectric scanning of a negative original and converts the image signal into a density signal representing a negative image. The A/D converter 15 receives the density signal representing a negative image sent from the logarithmic conversion circuit 14 and converts the density signal into a digital density signal representing a negative image. The masking processing means 16 converts the density signal sent from the A/D converter 15, i.e. the integral density signal, into an analytical density signal, thereby removing the effect of color impurity of the dyes in the negative original, and sends out the digital density signal representing a negative image, which is free from color impurity. The exposure correction table generating means 17 generates an exposure correction table. On the basis of the exposure correction table sent from the exposure correction table generating means 17, the exposure correction means 18 converts the density signal representing a negative image, which is sent from the masking processing means 16, into a density signal representing a negative image when the same object is recorded with a correct exposure. The negative-to-positive conversion means 19 converts the density signal representing a negative image, which is sent from the exposure correction means 18, into a density signal representing a positive image. The correction value calculating means 20 assists the negative-to-positive conversion means 19 and conducts fine density correction. The adder 21 adds a correction value supplied by the correction value calculating means 20 to the density signal representing a positive image, which is sent from the negative-to-positive conversion means 19, and sends the density signal representing a positive image obtained by the processings in the components of the negative original input signal processing section 3 to the color processing section 4.

Difference Between Positive and Negative Original Input Signal Processing Sections As described above, the embodiment of FIG. 1 is provided with two input signal processing sections, i.e. the positive original input signal processing section 2 and the negative original input signal processing section 3, to conduct different signal processings of image signals in accordance with the type of the image original (positive or negative) photoelectrically scanned on the input drum 1. As mentioned above, the signal processings in the negative original input signal processing section 3 are more complicated than in the positive original input signal processing section 2. This is because the image signal obtained by photoelectric scanning of a positive original may simply be converted into a density signal representing a positive image, whereas the image signal obtained by photoelectric scanning of a negative original must first be converted into a density signal representing a negative image and then be converted into a density signal representing a positive image. Further, the signal processings in the negative original input signal processing section 3 become complicated because negative originals are recorded under various exposure conditions (e.g. originals recorded at different F-numbers within the range of −2 to +4) and a density signal representing a negative image when the same object is recorded with a correct exposure cannot be obtained by use of a single predetermined exposure correction table. When the image signal obtained by photoelectric scanning of an original is input to the input signal processing section 2 or 3, the operator first judges whether it is a negative or a positive, and then operates a selecting switch to selectively input the image signal to the input signal processing section 2 or 3.

Signal Processings in Negative Original Input Signal Processing Section

The signal processings conducted in the negative original input signal processing section 3 will hereinbelow be described. As described above, since, unlike positive originals, negative originals are recorded under various exposure conditions, a density signal representing a negative image when the same object is recorded with a correct exposure cannot be obtained by use of a single predetermined exposure correction table. That is, the exposure correction table used in the exposure correction means 18 must be generated for each original. For this purpose, before a negative original is photoelectrically scanned on the input drum 1, the negative original is roughly pre-scanned to obtain a density signal, the density signal thus obtained is masking-processed and sent to the exposure correction table generating means 17 which detects the exposure conditions under which the negative original was recorded. On the basis of the exposure conditions thus detected, the exposure correction table generating means 17 generates a table for converting the density signal obtained by final scanning into a density signal representing a negative image when the same object is recorded with a correct exposure on the negative photosensitive material. The exposure correction table generated is sent to the exposure correction means 18. Further, in this embodiment, the microprocessor 10 is used for the exposure correction table generating means 17, and the exposure correction table is generated by Formula (2) described below. That is, when the shadow density of an original as calculated from the density accumulation histogram of the densities detected by pre-scanning is Ds, the shadow density of an original recorded with a correct exposure is Dso, and the characteristic curve of the input original photosensitive material as shown in FIG. 4 wherein the abscissa represents the exposure and the ordinate represents the density is expressed by $$D = f(x) \ldots \quad (1)$$

where $x = \log E$. Then a table value (D') is obtained by $$D' = f(f^{-1}(D) + \Delta x) \ldots \quad (2)$$

where $\Delta x = f^{-1}(Dso) - f^{-1}(Ds)$. In the long run, all densities are shifted in parallel by the exposure $\Delta x$ corresponding to the density difference between Dso and Ds on the characteristic curve of FIG. 4, and it thereby becomes possible to obtain a density signal representing a negative image recorded with a correct exposure.

In this embodiment, shadow points of the input original are used for judging the exposure conditions. However, instead of using the shadow point density, it is also possible to use highlight point density or other reference point densities (flesh color, sky color, and the like).

In order to effect the conversion in the negative-to-positive conversion means 19, a grey Macbeth chart is first recorded with a correct exposure on a negative photosensitive material and a positive photosensitive material and, for example, approximately 90 pairs of data on the densities on the negative photosensitive material and the densities on the positive photosensitive material are gathered. Then, these pieces of data are interpolationsmoothed, and a conversion curve for converting a density appearing when a grey object is recorded with a correct exposure on the negative photosensitive material into a density appearing when the same object is recorded with a correct exposure on the positive photosensitive material is generated for each of the three primary colors (Y, M and C). FIG. 5 is a graph showing the conversion curve represented by $D'i = fi(Di)$, wherein the abscissa designates the density on the positive photosensitive material and the ordinate designates the density on the negative photosensitive material. The conversion curve is input to the negative-to-positive conversion means 19. Correction which cannot be achieved by the negative-to-positive conversion means 19 is carried out by the correction value calculating means 20. In order to effect correction value calculation in the correction value calculating means 20, a color Macbeth chart is first recorded with a correct exposure on the negative photosensitive material and the positive photosensitive material and, for example, approximately 100 pairs of data on the densities of each color on the negative photosensitive material and the positive photosensitive material are gathered. Since these pieces of data are not data on grey, when they are plotted on the graph of FIG. 5, the results slightly deviate from the conversion curve of FIG. 5. In order to eliminate the deviation, the correction value calculating means 20 generates a required correction value $\Delta Di$ by Formula (3) using coefficients derived by the method of least squares from approximately 100 pairs of data mentioned above.

$$\Delta Di = D'i - fi(Di) \quad (3)$$
$$= a_{0i} + a_{1i}DY + a_{2i}DM + a_{3i}Dc +$$
$$a_{4i}DYDM + a_{5i}DMDC + a_{6i}DCDY +$$
$$a_{7i}DY^2 + A_{8i}DM^2 + a_{9i}DC^2$$

where i designates Y, M or C, and a0i, a1i, . . . , a9i designate the coefficients.

When the negative-to-positive conversion means 19 and the correction value calculating means 20 are operated as described above, the density signal representing a negative image recorded with a normal exposure, which is output from the exposure correction means 18, is converted to the density signal representing a positive image recorded with a normal exposure, which is then sent to the color processing section.

As described above, in the negative original input signal processing section 3, the density signal of an input negative original is converted into the density signal representing a negative image recorded with a normal exposure by the former half portion of the processing section 3, and then converted to the density signal representing a positive image recorded with a normal exposure by the latter half portion of the processing section 3. Accordingly, also for a negative original recorded under exposure conditions deviating to some extent from the normal conditions, it is possible to obtain a desired density signal at a very high accuracy.

Configuration of Color Processing Section

As shown in FIG. 6, the color processing section 4 comprises a color correction processing means 22, a sharpness enhancement processing means 23, and a gradation conversion processing means 24. The color correction processing means 22 receives the density signal representing a positive image in which the weight ratio of the Y, M and C three primary color signals is 1:1:1 and which is sent from the positive original input signal processing section 2 or the negative original input signal processing section 3, accurately discriminates the hue on the basis of the density signal, and conducts color correction of the density signal. The sharpness enhancement processing means 23 conducts a sharpening processing of the density signal corrected with respect to the color by the color correction processing means 22. Then, the gradation conversion processing means 24 carries out a gradation conversion processing of the density signal so that a desired gradation is realized on the target photosensitive material (i.e. the output photosensitive material when a positive image is output, or the ultimate printing photosensitive material when a negative image is output).

As described above, the color processing section 4 receives the density signal representing a positive image in which the weight ratio of the Y, M and C three primary color signals is 1:1:1 and which is sent from the input signal processing section 2 or 3, and conducts color processings such as the color correction, sharpness enhancement, gradation conversion, and the like, of the density signal so that a desired density is obtained on the positive output photosensitive material or the ultimate printing photosensitive material on which an intermediate negative is printed. Before an original is photoelectrically scanned on the input drum 1, data on the parameters and tables handled in the processing means 22, 23 and 24 is transferred from the microprocessor 10 and written into predetermined memories of the processing means 22, 23 and 24. The data can be changed by the operator when necessary.

This embodiment has a unique effect with respect to the setting and change of data in the processing means 22, 23 and 24 of the color processing section 4. That is, the density handled by the operator at the color processing section is always the density of a positive image since only the density signal representing a positive image is generated by the signal conversion conducted by the input signal processing sections 2 and 3. Also, since signal conversion to a desired type of image (positive or negative) reproduced on the output photosensitive material is carried out by the image output sections 5 and 6, the density output by the color processing section 4 is always of a positive image. Thus the color processings are always conducted with respect to a positive-positive system, and the operator can intuitively judge the density. Namely, since the color processings are conducted with respect to the positive-positive system, it is sufficient for the operator to change the data by considering only the color processings (color correction, sharpness enhancement, and gradation conversion) of the density formed on the photosensitive material which the operator is most concerned about. For example, when an intermediate negative is formed on the direct output photosensitive material by use of the density signal output from the image processing apparatus and then printed on the ultimate printing photosensitive material to realize a desired density thereon, it is possible to eliminate the time and labor the operator would have to spend in the case of a conventional apparatus for calculating a density on the output photosensitive material required for realizing the desired density on the ultimate printing photosensitive material on the basis of the desired density thereon. By "photosensitive material which the operator is most concerned about" is meant (1) the ultimate printing photosensitive material when a negative image is output, or (2) the direct output photosensitive material when a positive image is output.

Embodiments of the color correction processing means 22, the sharpness enhancement processing means 23 and the gradation conversion processing means 24 will hereinbelow be described in detail.

Outline of Processing Means of Color Processing Section

The color correction processing means 22 generates hue signals of Y (yellow), G (green), C (cyan), B (blue), M (magenta), and R (red) from the density signal in which the weight ratio of the Y, M and C three primary color signals is always 1:1:1 (hereinafter referred to as the equivalent neutral density signal) and which is input to the color processing section 4. The hue signals are then multiplied by correction coefficients and added to each other in the processing means 22, thereby conducting color correction of the Y, M and C three primary color signals. The sharpness enhancement processing means 23 generates an unsharp mask signal from an unsharp signal obtained from the image original and the equivalent neutral density signal. The unsharp mask signal is then multiplied by coefficients and the products are added to the Y, M and C three primary color signals in the processing means 23, thereby carrying out the sharpness enhancement processing of the Y, M and C three primary color signals. The gradation conversion processing means 24 has data tables for the Y, M and C three primary color signals wherein the input and the output are in one-to-one relation. Arbitrary data is written in advance as values corresponding to addresses from the microprocessor 10 into the data tables. On the basis of the data tables, the processing means 24 carries out the gradation conversion processing of the Y, M and C three primary color signals.

Circuit Configuration of Color Processing Section

The circuit configuration of the color processing section will hereinafter be described with reference to FIG. 7. The circuit configuration of FIG. 7 includes the circuits for converting the Y, M and C three primary color signals into the equivalent neutral density system. However, it should be understood that, when the conversion to the equivalent neutral density system is conducted in the color processing section 4, the conversion need not be carried out in the input signal processing sections 2 and 3. Digital density signals Y1, M1 and C1 sent from the input signal processing sections 2 and 3 are input to a data selector 115. A digital unsharp signal U1 obtained by digitally converting an unsharp signal detected from an image original is input to an unsharp mask signal generating circuit 116 together with the digital density signal M1. An unsharp mask signal U2 generated by the circuit 116 is input to the data selector 115. Outputs X11, X21 and X31 of the data selector 115 are respectively input to multiplication accumulators 120, 121 and 122. Outputs P1, P2 and P3 of the multiplication accumulators 120, 121 and 122 are respectively input to registers 126, 127 and 128 via slicing circuits 123, 124 and 125, and also to data selectors 133, 134 and 135. Outputs YE', ME' and CE' of the registers 126, 127 and 128 are input to a hue discrimination circuit 129. A hue signal CL discriminated by the hue discrimination circuit 129 is input to the data selector 115, and a hue address signal CAD indicating which hue is output is input to a memory address generating circuit 131. A memory address signal MAD generated by the memory address generating circuit 131 is input to memories 117, 118 and 119 via a data selector 132.

On the other hand, outputs ASY, ASM and ASC of the data selectors 133, 134 and 135 are respectively input to table memories 136, 137 and 138 used for gradation conversion. Hue signals Y3, M3 and C3 obtained by gradation conversion in the table memories 136, 137 and 138 are respectively input to D/A converters 145, 146 and 147 via registers 142, 143 and 144. Analog hue signals thus obtained from the D/A converters 145, 146 and 147 are output as color-corrected hue signals Y4, M4 and C4.

Outputs X12, X22 and X32 of the memories 117, 118 and 119 are respectively input to the multiplication accumulators 120, 121 and 122. Address signals for the memories 117, 118 and 119 are input thereto via an address bus AB connected to the microprocessor 10 and via the data selector 132. Coefficient signals transmitted through a data bus DB are input into the memories 117, 118 and 119 via input lines DI1, DI2 and DI3 and stored at the address positions specified by the address signals. Also, address signals for the table memories 136, 137 and 138 are input thereto via the address bus AB via the data selectors 133, 134 and 135. Data signals transmitted through the data bus DB are input into the table memories 136, 137 and 138 via gates 139, 140 and 141 and stored at the address positions specified by the address signals. The memories 117, 118 and 119 and the table memories 136, 137 and 138 are constituted by RAM's (random access memories). The memory address generating circuit 131 and the hue discrimination circuit 129 are timed by a timing control circuit 130. Also, timing signals T (t1 to t20) generated by the timing control circuit 130 control the data selector 115, the memories 117, 118 and 119, the data selectors 132, 133, 134 and 135, the gates 139, 140 and 141, the table memories 136, 137 and 138, and the registers 126, 127, 128, 142, 143 and 144 at the predetermined timings.

In the aforesaid configuration, the digital density signals Y1, M1 and C1 of a color original as measured through a three-color separation filter involve incorrect absorption with respect to the dyes constituting the color original and the filter, and weights of the digital density signals Y1, M1 and C1 are not necessarily equal to each other. However, the incorrectness can be eliminated by conducting the equivalent neutral density conversion by $$\begin{bmatrix} YE \\ ME \\ CE \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} Y_1 \\ M_1 \\ C_1 \end{bmatrix} \quad (4)$$

The matrix elements bij in Formula (4) are constants determined depending on the dyes constituting the color original and the color separation filter, and are adjusted to such values that, when gray of the color original is measured, the levels of YE, ME AND CE are the same. Formula (4) is constituted by the addition of the products of the constants bij and the signals Y1, M1, C1 in such manner as, for example, $YE=b11.Y1+b12.M1+b13.C1$. Therefore, the calculation of Formula (4) can be achieved by sequentially carrying out the multiplications and the additions for YE, ME and CE. In the memories 117, 118 and 119, coefficients DI1 (b11 to b14 and k11 to k16), DI2 (b21 to b24 and k21 to k26) and DI3 (b31 to b34 and k31 to k36) transmitted from the microprocessor 10 via the data bus DB are written in advance at the address positions specified by the address signals transmitted from the microprocessor 10 via the address bus AB. The coefficients b14, b24, b34, k11 to k16, k21 to k26, and k31 to k36 will be described later. The multiplication accumulators 120, 121 and 122 multiply the digital density signals Y1, M1 and C1 transmitted via the data selector 115 by the coefficients stored in the memories 117, 118 and 119, and accumulate the calculation results.

At this time, the timing control circuit 130 first controls to select the digital density signal Y1 from the input signals by the timing signal t1 for the data selector 115, and input the signal Y1 to the multiplication accumulators 120, 121 and 122. The memory address signal MAD of the memory address generating circuit 131 is sent to the address lines of the memories 117, 118 and 119 via the data selector 132 by the timing signal t5. As a result, the coefficients b11, b21 and b31 are respectively output from the memories 117, 118 and 119 and sent to the multiplication accumulators 120, 121 and 122. Thus the multiplication accumulators 120, 121 and 122 respectively generate the products b11.Y1, b21.Y1 and b31.Y1 as the outputs P1, P2 and P3. (This timing is referred to as timing I.)

At the next timing II, the digital density signal M1 is selected from the data selector 115 and input to the multiplication accumulators 120, 121 and 122. The memory address signal MAD of the memory address generating circuit 131 is sent to the memories 117, 118 and 119 via the data selector 132 to select the coefficients b12, b22 and b32 respectively stored therein and input them into the multiplication accumulators 120, 121 and 122. In the multiplication accumulators 120, 121 and 122, the digital density signal M1 is multiplied by the coefficients b12, b22 and b32 respectively, and the multiplication results are added to the products obtained at the timing I. As a result, b11.Y1+b12.M1, b21.Y1+b22.M1, and b31.Y1+b32.M1 are generated as the outputs P1, P2 and P3 of the multiplication accumulators 120, 121 and 122.

Then, at the next timing III, the digital density signal C1 is selected from the data selector 115 and input to the multiplication accumulators 120, 121 and 122. The coefficients b13, b23 and b33 are output from the memories 117, 118 and 119 and input to the multiplication accumulators 120, 121 and 122. Therefore, the results of the multiplications and the accumulation generated as the outputs P1, P2 and P3 of the multiplication accumulators 120, 121 and 122 become b11.Y1+b12.M1+b13.C1, b21.Y1+b22.M1+b23.C1, and b31.Y1+b32.M1+b33.C1.

Accordingly, at the timings I, II and III, as the outputs P1, P2 and P3 of the multiplication accumulators 120, 121 and 122, the equivalent neutral density signals YE, ME and CE are obtained as expressed by Formulae (5) which are transformed from Formula (4).

$$\begin{aligned} YE &= b_{11} \cdot Y_1 + b_{12} \cdot M_1 + b_{13} \cdot C_1 \\ ME &= b_{21} \cdot Y_1 + b_{22} \cdot M_1 + b_{23} \cdot C_1 \\ CE &= b_{31} \cdot Y_1 + b_{32} \cdot M_1 + b_{33} \cdot C_1 \end{aligned} \quad (5)$$

The equivalent neutral density signals YE, ME and CE are respectively stored as YE', ME' and CE' in the registers 126, 127 and 128 via the slicing circuits 123, 124 and 125. The slicing circuits 123, 124 and 125 operate so that, when the inputs YE, ME and CE are larger than predetermined maximums or smaller than predetermined minimums, the predetermined maximums or minimums are output. Further, during the timings I, II and III, the unsharp mask signal U2 is generated by the unsharp mask signal generating circuit 116. In this example, the unsharp mask signal U2 is calculated by $U1=M1-U$.

At the next timing IV, the unsharp mask signal U2 is output from the data selector 115 and input to the multiplication accumulators 120, 121 and 122 together with the coefficients b14, b24 and b34 selected and output from the memories 117, 118 and 119. The multiplication accumulators 120, 121 and 122 multiply the unsharp mask signal U2 by the coefficients b14, b24 and b34 respectively and add the products to the accumulated values YE, ME and CE. As a result, YS, MS and CS represented by Formulae (6) are generated as the outputs P1, P2 and P3.

$$\left.\begin{aligned} YS &= YE + b_{14} \cdot U_2 \\ MS &= ME + b_{24} \cdot U_2 \\ CS &= CE + b_{34} \cdot U_2 \end{aligned}\right\} \quad (6)$$

Further, at the timing V, calculations of selective color correction are conducted. The selective color correction is conducted by $YC=YS+YCC$, $MC=MS+MCC$, and $CC=CS+CCC$ by using correction signals YCC, MCC and CCC which are represented by $$\left.\begin{aligned} YCC &= k_{11} \cdot (Y) + k_{12} \cdot (G) + k_{13} \cdot (C) + \\ & \quad k_{14} \cdot (B) + k_{15} \cdot (M) + k_{16} \cdot (R) \\ MCC &= k_{21} \cdot (Y) + k_{22} \cdot (G) + k_{23} \cdot (C) + \\ & \quad k_{24} \cdot (B) + k_{25} \cdot (M) + k_{26} \cdot (R) \\ CCC &= k_{31} \cdot (Y) + k_{32} \cdot (G) + k_{33} \cdot (C) + \\ & \quad k_{34} \cdot (B) + k_{35} \cdot (M) + k_{36} \cdot (R) \end{aligned}\right\} \quad (7)$$

Figure 8:
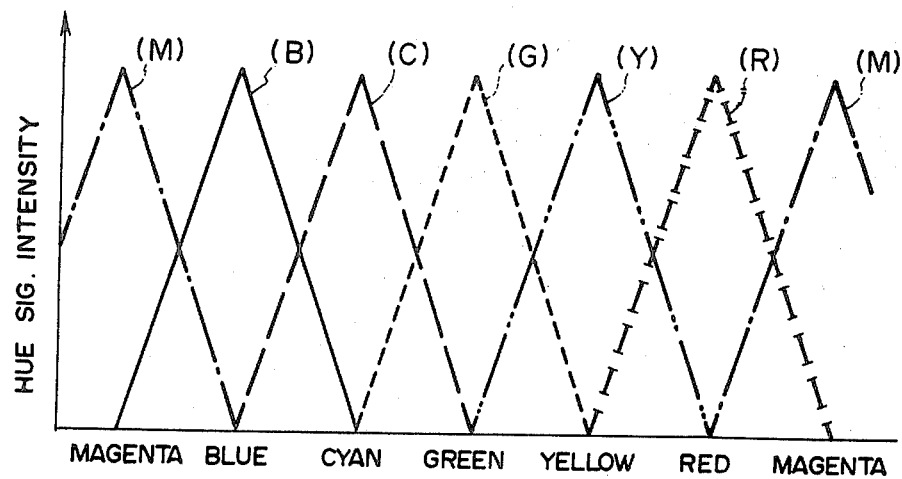
FIG. 8 is a graph showing the hue signals generated by the hue discrimination circuit shown in FIG. 7.

(Y), (G), (C), (B), (M), and (R) in Formulae (7) are hue signals obtained by equally dividing all hues as shown in FIG. 8. The hue signals (Y) to (R) are generated by the hue discrimination circuit 129 during the timing IV. As is clear from FIG. 8, at most two of the six hue signals are output for each hue. Therefore, in the multiplication accumulators 120, 121 and 122, multiplications by the coefficients kij and additions of the products are conducted for the two hue signals. Namely, at the timing V, the timing control circuit 130 controls to first output one of the hue signals (Y) to (R) as the output CL from the hue discrimination circuit 129 and to send it to the multiplication accumulators 120, 121 and 122 via the data selector 115. The coefficients kij are adjusted by the operator to values suitable for forming desired densities representing a positive image which should be realized on the output photosensitive material or the ultimate printing photosensitive material. The hue address signal CAD indicating which hue signal is output is transmitted from the hue discrimination circuit 129 to the memory address generating circuit 131, and the memory address generating circuit 131 outputs the memory address signal MAD for reading out the coefficients kij corresponding to the hue signal. When the memory address signal MAD is sent to the memories 117, 118 and 119 via the data selector 132, the coefficients kij stored in advance in the memories 117, 118 and 119 are selected and output to the multiplication accumulators 120, 121 and 122. In the multiplication accumulators 120, 121 and 122, the products of the hue signal and the coefficients kij are added to the previously accumulated values YS, MS and CS. Further, at the next timing VI, calculations are carried out in the same manner for the remaining one of the two hue signals, and YC, MC and CC are generated as the outputs P1, P2 and P3 of the multiplication accumulators 120, 121 and 122.

Figure 9:
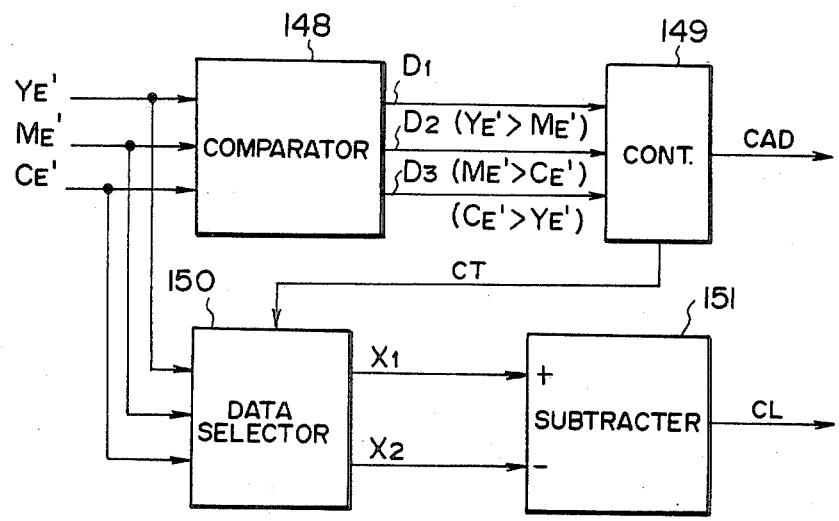
FIG. 9 is a block diagram showing an embodiment of the hue discrimination circuit shown in FIG. 7.

The hue discrimination circuit 129 may be realized, for example, by a circuit configuration as shown in FIG. 9. Operations of the circuit configuration will hereinbelow be described.

Signals YE', ME' and CE' are input to a comparator 148 and a data selector 150. The comparator 148 compares the levels of YE', ME' and CE' and sends the comparison output signals to a control circuit 149. For example, when YE'>ME'>CE', the comparator 148 generates output signals D1 (YE'>ME'), D2 (ME'>CE'), and D3 (CE'>YE') which are respectively at logic "1", "1" and "0" levels. On the basis of the output signals D1, D2 and D3, the control circuit 149 sends a control signal CT to the data selector 150 so that the data selector 150 selects and outputs YE' and ME' as outputs X1 and X2 at a first timing, and selects and outputs ME' and CE' at a second timing. Signals YE' and ME' selected as the outputs X1 and X2 of the data selector 150 at the first timing are sent to an addition input terminal and a subtraction input terminal of a subtracter 151, and the subtraction result of $CL=YE'-ME'$ is obtained as the output of the subtracter 151. At the second timing, ME' and CE' are selected as the outputs X1 and X2 of the data selector 150, and the subtraction result of $CL=ME'-CE'$ is obtained as the output of the subtracter 151. The signals CL generated at the first and second timings correspond to the hue signals (Y) and (R).

Multiplications and additions are completed as described above, and the corrected color signals YC, MC and CC obtained thereby are sent through the slicing circuits 123, 124 and 125, and the data selectors 133, 134 and 135 into the gradation conversion table memories 136, 137 and 138 as the address signals ASY, ASM and ASC. The table memories 136, 137 and 138 store the data tables in which the inputs and the outputs are in one-to-one relation, and conduct gradation conversion in a desired manner on the basis of the data written in advance in conformity with the addresses. The corrected color signals Y3, M3 and C3 gradation-converted by the table memories 136, 137 and 138 are output from the color processing section 4 via the latching registers 142, 143 and 144.

When the coefficient signals are written into the memories 117, 118 and 119, address signals are output from a computer or the like to the address bus AB and input to the address lines of the memories 117, 118 and 119 via the data selector 132. At the same time, the coefficient signals are output to the data bus DB and input to the data input lines DI1, DI2 and DI3 of the memories 117, 118 and 119. Further, the timing signals t2, t3 and t4 are input to the memories 117, 118 and 119, and the coefficient signals are thereby sequentially written into the corresponding address positions as specified. At this time, the data selector 132 operates to select the address signals sent from the outside. Also when data signals are written into the table memories 136, 137 and 138, address signals sent through the address bus AB are input to the address lines ASY, ASM and ASC of the table memories 136, 137 and 138 via the data selectors 133, 134 and 135. The data signals sent through the data bus DB are input to the data input/output lines of the table memories 136, 137 and 138 via the gates 139, 140 and 141. Further, the timing signals t12, t13 and t14 are input to the table memories 136, 137 and 138 and the gradation conversion data signals are sequentially written into the corresponding address positions as specified.

As the coefficients stored in the memories 117, 118 and 119 and the data stored in the table memories 136, 137 and 138, coefficients and data corresponding to various combinations of image originals with reproduced images are stored in advance in the microprocessor 10. The coefficients and data are selected or generated by use of a selecting and generating means (manual or automatic) on the basis of various pieces of information on the image originals and reproduced images, and stored in the memories 117, 118 and 119 and the table memories 136, 137 and 138. On a front panel of the image processing apparatus are installed digital switches (not shown) for facilitating the operations by the operator so that the operator can change the coefficients and the data.

In the color processing section 4 as described above, since the equivalent neutral density signals representing a positive image are input to the hue discrimination circuit 129, hue discrimination is conducted accurately and, consequently, color correction processings are achieved accurately.

Image Output Sections

The positive image output section 5 and the negative image output section 6 for converting the density signals representing a positive image, which are color-processed and output by the color processing section 4, into signals for controlling the light amount emitted from the exposure light source 7 to the output photosensitive material will hereinafter be described with reference to FIGS. 10 and 11.

Configuration of Positive Image Output Section

As shown in FIG. 10, the positive image output section 5 comprises a light amount control signal conversion means 25, and a D/A conversion means 26. The light amount control signal conversion means 25 has a light amount control signal conversion table for converting the density signal representing a positive image on the output photosensitive material, which is output from the color processing section 4, into the light amount control signal for controlling the light amount necessary for forming the density corresponding to the density signal representing a positive image and emitted from the exposure light source 7. The D/A conversion means 26 subsequently converts the light amount control signal to an analog signal.

Configuration of Negative Image Output Section

As shown in FIG. 11, the negative image output section 6 comprises a printing density conversion means 27, a positive-negative calculation means 28, a light amount control signal conversion means 29, and a D/A conversion means 30. The printing density conversion means 27 and the positive-negative calculation means 28 convert the density signal representing a positive image on the ultimate printing photosensitive material, which is output from the color processing section 4, into a density signal representing a negative (intermediate negative) image on the direct output photosensitive material, which is necessary for realizing the density corresponding to the density signal representing a positive image. The light amount control signal conversion means 29 has a light amount control signal conversion table for converting the density signal representing a negative image on the direct output photosensitive material into a light amount control signal for controlling the light amount which is necessary for forming the density corresponding to the density signal representing a negative image and which is emitted from the exposure light source 7. The D/A conversion means 30 subsequently converts the light amount control signal to an analog signal.

Difference Between Positive and Negative Image Output Sections

As described above, this embodiment is provided with the positive image output section 5 and the negative image output section 6, and the density signal output from the color processing section 4 is processed in one of the image output sections 5 and 6 according to the type of the image (positive or negative) which should be formed on the direct output photosensitive material, and then be output to the outside of the apparatus. The signal processings in the negative image output section 6 is more complicated than those in the positive image output section 5. This is because the signal output from the color processing section is the density signal representing a positive image, and it is sufficient to simply convert the density signal into the light amount control signal for forming a positive density on the direct output photosensitive material in the positive image output section 5 whereas, in the negative image output section 6, the density signal must first be converted into a density signal representing a negative image and then into the light amount control signal for forming a negative density on the direct output photosensitive material. Further, the density signal representing a negative image in the negative image output section 6 is the one which forms a negative (intermediate negative) image realizing a desired positive image on the ultimate printing photosensitive material when printed thereon. In order to convert the density signal output from the color processing section 4 into the density signal representing a negative image as mentioned above, complicated signal processings are necessary. When the output signal of the color processing section 4 is input to one of the image output sections 5 and 6, the operator operates a selecting switch to selectively input the output signal to the image output section 5 or 6 according to the type of density (density representing a positive image or density representing a negative image) on the output photosensitive material which the operator desires.

Signal Processings in Negative Image Output Section

Signal processings conducted in the negative image output section 6 will hereinbelow be described. The density signal representing a positive image to be realized on the printing photosensitive material, which is output from the color processing section 4 is input to the printing density conversion means 27 in which the density signal is converted into a printing density for the printing photosensitive material on the basis of the printing density conversion table. The printing density signal is input to the positive-negative calculation means 28 and converted by a positive-negative calculation circuit (multiplication accumulator) thereof into a density signal representing a negative image on the output photosensitive material. The density signal representing a negative image is the one which can form an intermediate negative realizing a desired density on the printing photosensitive material when printed thereon. The positive-negative calculation circuit calculates $$\Delta Di = C_{0i} + C_{1i}Yc + C_{2i}Mc + C_{3i}Cc +$$
$$C_{4i}YcMc + C_{5i}McCc + C_{6i}CcYc +$$
$$C_{7i}Yc^2 + C_{8i}Mc^2 + C_{9i}Cc^2 \quad (8)$$

where Di designates the density representing a negative image on the output photosensitive material, and $C_{0i}$, $C_{1i}, \ldots, C_{9i}$ are the coefficients.

Thereafter, the density signal generated by the calculation means 28 is input to the light amount control signal conversion means 29 and converted therein into a light amount control signal for controlling the light amount of the exposure light source 7 by use of the light amount control signal conversion table.

Setting of the printing density conversion table in the printing density conversion means 27 and setting of the coefficients $C_{0i}, C_{1i}, \ldots, C_{9i}$ of Formula (8) used for calculation in the positive-negative calculation means 28 will hereinbelow be described in detail.

As for the setting of the printing density conversion table, it is sufficient to store the inverse function of the characteristic curve in the printing density conversion means 27 in the form of a digital memory. The characteristic curve is the curve indicating the characteristics of the photosensitive material on a graph wherein the abscissa represents the common logarithm of the exposure E and the ordinate represents the photographic density D.

As for the setting of the coefficients $C_{0i}, C_{1i}, \ldots, C_{9i}$ of Formula (8), when the printing conditions for the printing photosensitive material are known, integration for calculating the printing density on the printing photosensitive material from the density on the output photosensitive material under the same conditions is conducted in advance for several hundreds of sets of densities (DY, DM, DC) on the output photosensitive material by use of a microprocessor or the like. From several hundreds of pieces of data obtained thereby, it is possible to determine the coefficients $C_{0i}, C_{1i}, \ldots, C_{9i}$ satisfying Formula (8) by the method of least squares.

The aforesaid integration is conducted by $$P = -\log \frac{\int S\lambda J\lambda T\lambda d\lambda}{\int S\lambda J\lambda T_B\lambda d\lambda} \quad (9)$$

where $\lambda$ denotes the wavelength, $S\lambda$ denotes the spectral sensitivity of the printing photosensitive material, $J\lambda$ designates the spectral intensity of the printer light source, $T\lambda$ denotes the spectral transmittance of the output photosensitve material ($T\lambda = 10^{-D\lambda}$ where $D\lambda$ designates the spectral density of the output photosensitive material), and $T_{B\lambda}$ denotes the base spectral transmittance of the output photosensitive material.

In Formula (9), when the output photosensitive material is for forming a negative image, $T_{B\lambda}$ is the orange mask spectral transmittance of the photosensitive material. When the output photosensitive material is not a negative photosensitive material, for example, when it is a duplicate film or the like, it is sometimes desired to form a color of a density corresponding to the orange mask by use of the Y, M and C three primary color signals. In this case, the spectral transmittance obtained by representing the orange mask by the Y, M and C three primary color signals (the spectral transmittance is approximately equal to that of the aforesaid negative photosensitive material) is substituted for $T_{B\lambda}$. As a result, the density Di on the output photosensitive material calculated by Formula (8) by use of the coefficients Cij obtained from the sample data is output as the density accommodating the density of the orange mask correcting the incorrect absorption on the output photosensitive material. That is, it is possible to obtain an image to which the orange mask is applied as in the case of an image formed on the negative photosensitive material.

Printing density is described in detail in James, *The Theory of the Photographic Process* (Macmillan, 1977), pp. 519–523.

After the signal processings are conducted as described above, the light amount control signal generated by the negative image output section 6 is input to the acousto-optic modulator (AOM) 8 and used therein to control the light amount of the exposure light source 7, thereby forming a desired negative image on the output photosensitive material loaded on the output drum 9.

Also, the light amount control signal generated by the positive image output section 5 is input to the acousto-optic modulator (AOM) 8 and used therein to control the light amount of the exposure light source 7, thereby forming a desired positive image on the output photosensitive material loaded on the output drum 9.

In the aforesaid embodiment, the image output sections 5 and 6 are provided as described above. When the density representing a positive image is formed on the output photosensitive material, the light amount control signal for forming the density is output by the positive image output section 5. When the density representing a negative image is formed on the output photosensitive material, the negative image output section 6 converts the density which should be realized on the ultimate printing photosensitive material into the density representing the negative image on the output photosensitive material and then generates the light amount control signal for forming the density. Accordingly, when the color processings are conducted in the color processing section 4, it is possible to determine the conversion coefficients and the conversion data by considering only the density representing a positive image which should be formed on the output photosensitive material or the density (representing a positive image) which should be realized on the ultimate printing photosensitive material. Particularly, when the density representing a negative image is formed on the output photosensitive material and the conversion coefficients and the conversion data are determined or changed by the operator, it is not necessary for the operator to calculate the density which should be formed on the output photosensitive material from the density which should be realized on the ultimate printing photosensitive material. Thus the burden on the operator is decreased, and the desired density representing a negative image can readily be formed on the output photosensitive material regardless of the skill of the operator. Further, it is possible to always realize the desired density on the ultimate printing photosensitive material.

Further, since the positive image output section 5 and the negative image output section 6 output the light amount control signals suitable for the type of the output photosensitive material, it is also possible to use a photosensitive material which is generally used as a positive photosensitive material, or the like, as the output photosensitive material for forming the density representing a negative image, for example.

are output, a part of the table memories and a part of the calculation circuits become unnecessary. In such cases, identity processings are conducted to achieve the common use of the circuits. By "identity processings" are meant such processings as make the input signals and the output signals identical with each other. Table 1 shows the jobs which the means of the input signal processing section and the image output section conducts in accordance with the type (positive or negative) of the input original and the type (positive or negative) of the output image.

TABLE 1

| | | Negative original input | Positive original input |
|---|---|---|---|
| Input signal processing section | Masking processing means | Masking processing | Masking processing |
| | Exposure correction means | Exposure correction table | Identity processing |
| | Negative-to-positive conversion means | Negative-to-positive conversion table | Identity processing |
| | Correction value calculating means | Correction calculation processing | All coefficients aij = 0 |
| Color processing section | | | |
| Image output section | Printing density conversion means | Printing density conversion table | Identity processing |
| | Positive-negative calculation means | Positive-to-negative conversion calculation | Identity processing |
| | Light amount control signal conversion means | Light amount control signal conversion table | Light amount control signal conversion table |
| | | Negative image output | Positive image output |

Effects of Embodiment

The configurations of the components, the signal processings and the effects of the embodiment of the image processing apparatus in accordance with the present invention are described above. In the aforesaid embodiment, the signal processings are conducted quickly on a real time basis by use of the digital circuits employing the table memories and multiplication accumulators, and it is not necessary to use large-capacity image memories and circuits for conducting integration. Therefore, it is possible to constitute a small, cheap system.

Modification of Embodiment

In the above-described embodiment, the positive original input signal processing section 2 and the negative original input signal processing section 3 are independently provided as the input signal processing sections, and the positive image output section 5 and the negative image output section 6 are independently provided as the image output sections. In another preferred embodiment of the image processing apparatus in accordance with the present invention, the positive original input signal processing section 2 and the negative original input signal processing section 3 are constituted by common circuits, so that the circuits of FIG. 3 would be used for both the positive and negative original input signal processing sections, and the positive image output section 5 and the negative image output section 6 are constituted by common circuits so that the circuits of FIG. 11 would be used for both the positive and negative image output sections. As described above, the circuit configurations of the positive original input signal processing section 2 and the positive image output section 5 may be simpler than those of the negative original input signal porcessing section 2 and the negative image output section 6. Therefore, when positive original signals are input and when positive images Further, in the above-described embodiment, density correction is conducted in the negative original input signal processing section by use of the correction value calculating means 20 for carrying out fine density correction. However, when it is not necessary to conduct strict density correction or when the negative original is monochromatic, it is possible to cascade the exposure correction table of the exposure correction means 18 and the negative-to positive conversion table of the negative-to-positive conversion means 19 and unify them into one table.

Also, it is possible to change the calculation by Formula (3) conducted in the correction value calculating means 20, for example, as shown below in accordance with the level of accuracy required.

That is, when a high accuracy is not required, Formula (3) may be changed to $$D_i' = a_{0i} + a_{1i}D_Y + a_{2i}D_M + a_{3i}D_C$$
$$(i = Y, M, C)$$

When a high accuracy is required, Formula (3) may be changed to $$D_i' = a_{0i} + a_{1i}D_Y + a_{2i}D_M + a_{3i}D_C +$$
$$a_{4i}D_YD_M + a_{5i}D_MD_C + a^6{}_iD_CD_Y +$$
$$a_{7i}D_Y^2 + a_{8i}D_M^2 + a_{9i}D_C^2 +$$
$$a_{10i}D_yD_MD_C + a_{11i}D_YD_M^2 +$$
$$a_{12i}D_Y^2D_M + \ldots$$

Also, when it is necessary to generate a black separation signal in the color processing section 4, it is possible to conduct generation of the black separation signal simultaneously with the selective color correction by detecting YS, MS and CS from the outputs P1, P2 and P3 when calculations up to the timing IV are completed, sending them to a black separation signal generating circuit, and conducting a calculation for generating the black separation signal at the timings V and VI.

Further, in the aforesaid embodiment, the coefficients stored in the memories 17, 18 and 19 are stored in advance in the microprocessor 10. However, the coefficients may also be stored in a RAM, a ROM, or the like.

Furthermore, when a monochromatic negative is formed by three-color separation on a monochromatic photosensitive material by use of the output signal of the negative image output section 6, it is not necessary to generate an orange mask as in the case where a color negative image is formed. That is, the spectral transmittance of the monochromatic photosensitive material (in a non-exposed condition) may be used as $T_{B\lambda}$ in Formula (9).

Also, instead of using the digital circuits for carrying out the signal processings, it is also possible to conduct the signal processings by use of analog circuits.

We claim:

1. An image processing apparatus adapted to selectively generate positive and negative image outputs from negative and positive originals, which comprises:
   (i) a positive original input signal processing section for converting a positive image signal obtained by photoelectric scanning of a positive original into a density signal representing a positive image,
   (ii) a negative original input signal processing section for converting a negative image signal obtained by photoelectric scanning of a negative original into a density signal representing a positive image,
   (iii) a color processing section provided with processing means such as a gradation conversion means, a color correction means and a sharpness enhancement means for conducting color processing of said density signal representing a positive image which is input from said positive original input signal processing section or said negative original input signal processing section so that a desired density is obtained on an output photosensitive material or an ultimate printing photosensitive material and for sending out the color-processed density signal representing a positive image as an output signal,
   (iv) a positive image output section for converting said output signal of said color processing section into a light amount control signal for a light source emitting light to which an output photosensitive material for forming a positive image is exposed, and for sending out said light amount control signal, and
   (v) a negative image output section for converting said output signal of said color processing section into a density signal representing a negative image, converting said density signal representing a negative image into a light amount control signal for a light source emitting light to which a photosensitive material for forming an intermediate negative is exposed, and then sending out said light amount control signal, said negative image output section converting said output signal of said color processing section into said density signal representing a negative image so that the density of a negative image obtained by exposing said photosensitive material for forming an intermediate negative on the basis of said light amount control signal sent out from said negative image output section is such that said desired density is obtained when said negative image is printed on the ultimate printing photosensitive material.

2. An apparatus as defined in claim 1 wherein said negative original input signal processing section converts said negative image signal into said density signal representing a positive image so that the weight ratio of Y, M and C primary color signals is always 1:1:1 for a gray original, and said positive original input signal processing section converts said positive image signal into said density signal representing a positive image so that the weight ratio of Y, M and C primary color signals is always 1:1:1 for a gray original.

3. An apparatus as defined in claim 1 wherein said positive original input signal processing section and said negative original input signal processing section are constituted by common circuits.

4. An apparatus as defined in claim 1 wherein said positive input output section and said negative image output section are constituted by common circuits.

* * * * *